United States Patent
Kamarel (12)

(10) Patent No.: US 6,194,009 B1
(45) Date of Patent: *Feb. 27, 2001

(54) REFRIGERATION-SHELF-STABLE ULTRA-PASTEURIZED OR PASTEURIZED INFANT FORMULA

(75) Inventor: A. Reza Kamarel, Princeton, NJ (US)

(73) Assignee: Princeton Nutrition, LLC, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/517,269

(22) Filed: Mar. 2, 2000

Related U.S. Application Data

(63) Continuation-in-part of application No. 09/305,071, filed on May 4, 1999, now Pat. No. 6,039,985, which is a continuation-in-part of application No. 08/975,692, filed on Nov. 21, 1997, now Pat. No. 5,985,339.
(60) Provisional application No. 60/031,637, filed on Nov. 22, 1996.

(51) Int. Cl.[7] .................................................. A23L 1/30
(52) U.S. Cl. .............................. 426/72; 426/73; 426/74; 426/233; 426/324; 426/397; 426/521; 426/548; 426/656; 426/657; 426/658; 426/801; 229/213
(58) Field of Search .................................. 426/72, 73, 74, 426/397, 233, 324, 648, 521, 548, 656, 657, 658, 801; 229/213

(56) References Cited

U.S. PATENT DOCUMENTS

| | | | |
|---|---|---|---|
| 2,379,586 | 7/1945 | Manning et al. | 99/11 |
| 3,097,947 | 7/1963 | Kemmerer et al. | 99/63 |
| 3,385,714 | 5/1968 | Smith | 99/171 |
| 3,536,494 | 10/1970 | Johnson | 99/11 |
| 3,950,547 | 4/1976 | Lamar, III et al. | 426/74 |
| 4,070,488 | 1/1978 | Davis | 426/72 |
| 4,112,123 | 9/1978 | Roberts | 426/72 |
| 4,235,936 | 11/1980 | Kahn et al. | 426/330.3 |
| 4,268,529 | 5/1981 | Davis et al. | 426/72 |
| 4,332,824 | 6/1982 | Kahn et al. | 426/330.3 |
| 4,414,238 | 11/1983 | Schmidl | 426/602 |
| 4,486,413 | 12/1984 | Wisenberger et al. | 424/177 |
| 4,490,401 | 12/1984 | Becker et al. | 426/407 |
| 4,497,800 | 2/1985 | Larson et al. | 514/2 |
| 4,710,387 | 12/1987 | Uiterwaal et al. | 426/72 |
| 4,801,466 | 1/1989 | Clyne et al. | 426/232 |
| 4,803,087 | 2/1989 | Karinen | 426/73 |
| 4,853,246 | 8/1989 | Stevens | 426/580 |
| 4,992,282 | 2/1991 | Mehansho et al. | 426/72 |
| 5,013,569 | 5/1991 | Rubin | 426/585 |
| 5,064,674 | 11/1991 | Girsh | 426/580 |
| 5,104,677 | 4/1992 | Behr et al. | 426/590 |
| 5,126,162 | 6/1992 | Erasmus | 426/657 |
| 5,200,226 | 4/1993 | Rodriguez | 426/585 |
| 5,266,343 | 11/1993 | Stauffer | 426/522 |
| 5,415,885 | 5/1995 | Owades et al. | 426/590 |
| 5,416,077 | 5/1995 | Hwang et al. | 514/54 |
| 5,421,512 | 6/1995 | Poole | 229/249 |
| 5,431,939 | 7/1995 | Cox et al. | 426/300 |
| 5,447,741 | 9/1995 | Goldman | 426/580 |
| 5,449,523 | 9/1995 | Hansen et al. | 426/42 |
| 5,470,597 | 11/1995 | Mendenhall | 426/521 |
| 5,514,391 | 5/1996 | Bushnell et al. | 426/237 |
| 5,520,948 | 5/1996 | Kvamme | 426/590 |
| 5,555,702 | 9/1996 | Sizer | 53/127 |
| 5,558,897 | 9/1996 | Goldman | 426/580 |
| 5,641,531 | 6/1997 | Liebrecht et al. | 426/583 |
| 5,766,621 | 6/1998 | Trimbo et al. | 424/439 |

OTHER PUBLICATIONS

M. J. Lewis, Heat Treatment of Milk, In: Modern Dairy Technology, vol. 1 Advances in Milk Processing, 2nd Edition, Chapman & Hall, 1994.
I. Rosenthal, Milk and Dairy Products—Properties and Processing, Balaban Publishers, 1991.
H. Burton, Ultra–High–Temperature Processing of Milk and Milk Products, Elsevier Applied Science, 1988.
G. Bonin et al., Fluid Milk, in: Dairy Science and Technology—Principles and applications, les presses de l'university laval, Quebec, 1985.
R. Early, The Technology of Dairy Products, VCH Publishers, NY, 1992.
A.H. Varnam and J.P. Sutherland, Milk and Milk Products—Technology, Chemistry, and Microbiology, Chapman & Hall, 1994.
Preventing Microbial Contamination of Enteral Formulas and Delivery System, Ross Product Division, Abbott Laboratories, Columbus, Ohio Apr. 1996.
Ross Medical Nutritional System, A Total Commitment to Enteral Nutrition, 1995, ppg. 2–3, 6–15, 18–19, 22–39, 44–49, 52–57.
Ross Products Division, Abbott Laboratories, 1996, Advertisement for Ensure® Light.
Ross Products Division, Abbott Laboratories, Jan. 1996, Advertisement for Ensure® Light.
Mead Johnson, Enteral Systems Guide, 1994, ppg. 2–11, 18–25, 30, 34–37.
Mead Johnson, boost® Nutritional Energy Drink Advertisement, 1995.
Mead Johnson, Kangaroo ® Delivery Systems Advertisement, 1996.
Mead Johnson Nutritionals, Sep. 1996, Advertisement.
Sandoz Nutrition, Enternal Products Pocket Guide, 1995, ppg. 4–27, 30–39.
Clintec, Enteral Product Guide, 1994, ppg, 2–3, 10–13, 20–29, 34–67.
Sherwood Medical, Enteral Formulas, 1995, ppg. 6–11, 14–17, 20–21, 24–24.
D.J. Raiten et al., Assessment of Nutrient Requirements for Infant Formulas, J. of Nut., V. 128, No. 11S, Nov. 1998 Supplement, pp. 2059S–2078S.

Primary Examiner—Chhaya D. Sayala
(74) Attorney, Agent, or Firm—Hoffman & Baron, LLP

(57) ABSTRACT

Refrigeration-shelf-stable ready-to-feed and concentrated infant formulas can be prepared through a ultra-pasteurization and/or pasteurization process. The ultra-pasteurized and/or pasteurized infant formulas contain complete balanced quantities of nutrients.

16 Claims, No Drawings

REFRIGERATION-SHELF-STABLE ULTRA-PASTEURIZED OR PASTEURIZED INFANT FORMULA

RELATED APPLICATIONS

The present application is a continuation-in-part to U.S. Ser. No. 09/305,071, filed May 4, 1999, now U.S. Pat. No. 6,039,985, issued Mar. 21 2000, which is a continuation-in-part of U.S. Ser. No. 08/975,692, filed Nov. 21, 1997, now U.S. Pat. No. 5,985,339 issued Nov. 16,1999, which claimed priority to U.S. Provisional Application Ser. No. 60/031,637, filed Nov. 22, 1996, all of which are incorporated in their entirety herein by reference.

FIELD OF THE INVENTION

This invention relates to refrigeration-shelf-stable ready-to-feed and concentrated infant formulas and products which are prepared using ultra-pasteurization or pasteurization processes.

BACKGROUND OF THE INVENTION

Infant formula is used as a supplement to or substitute for breast milk when a mother cannot or does not want to breast feed her infant. Ideally, the composition of the infant formula would be exactly the same as the composition of human milk. Nonetheless, because infant formulas are typically made with cow milk (and sometimes soy protein), on a molecular level, these formulas are not the same as human milk. Nonetheless, infant formulas are designed to mimic the formulation of human milk as much as possible. Furthermore, infant formulas should contain nutrients as listed by governmental standards, for instance by the U.S. Code of Federal Regulations (21 CFR 107.100, 1998) as presented in Table 1A, or by responsible organizations as requested by governmental authorities, for instance by the Life Sciences Research Office (LSRO) of the American Society for Nutritional Sciences as presented in Table 1B. The resultant infant formulas are sometimes called "humanized milk", "simulated human milk", "simulated mother milk", "simulated breast milk" and "infant nutritional formula".

An infant formula which contains all the essential macronutrients and micronutrients, have heretofore been available only in shelf-stable sterilized products. Sterilized products are generally sold in hermetically sealed containers such as cans and are intended to have a long room temperature shelf-life. Table 2 lists several commercially available shelf-stable sterilized infant formulas. As will be discussed further herein, sterilization processes, due to the severity of the heat treatment can cause undesirable physical, chemical, enzymatic and microbial changes which deleteriously affect the final product.

Moreover, although such sterilized products are often marketed as "ready-to-feed" (RTF), they are typically stored at room temperature, and enzymatic reactions still occur, albeit slower, during room temperature storage of sterilized products. Such reactions can result in a host of undesirable defects, such as the destruction of vitamins which are necessary to the integrity of the overall product. Since sterilized products are designed to have up to one and a half (1½) year of room temperature shelf-life, such products will have a different actual content of degradable micro nutrients (vitamins) in the early part of its shelf-life as compared to the latter part. Thus, an infant will obtain a different and unknown amount of vitamins depending on when the sterilized product is consumed.

To account for this degradative process during long-term shelf-life, manufacturers of sterilized infant formulas often include up to 50% to 70% more of a given vitamin than would normally be included to account for the inherent degradation loss and to ensure the product is likely to contain at least the labeled amount of nutrients at the end of its shelf-life. Such large overdosing results in an imbalance in the taste of the product, particularly if consumed in the early stages of its shelf-life. Moreover, the cost factor of including such large overdoses is considerable. In addition to the high cost of sterilization, and increased overdosing of vitamins, sterilization processes require high cost packaging, such as in metal cans.

Like milk, liquid infant formulas (usually containing milk proteins and sometimes soy protein) are heated for a variety of reasons, the main reasons being: to remove potential pathogenic organisms and to increase shelf-life. The major concerns about the resulting products of thermal process are safety and quality. Like milk, heat-treated infant formulas should not be a public heath risk. They should have a good keeping quality, provide an intended balance of nutrients, and be of desirable sensory characteristics, i.e., appearance, color, flavor, and mouth feel. When milk or infant formulas are heated at a constant temperature, all their constituents and components will be affected, but to different extents. Increasing the temperature will accelerate reaction rates. But different reactions will be affected to different extents. Physical, chemical, enzymatic and microbial changes will depend principally upon the time-temperature conditions, but will also be influenced by other factors, such as composition, pH, and oxygen content. The wide range of reactions taking place when infant formulas are heated will influence the safety and quality of the product. Upon heating of products at higher temperatures for longer times, some undesirable changes can also take place (e.g., decrease in pH, Maillard browning, cooked caramel flavor, denaturation of whey proteins and interaction with casein). The changes that take place during heating and subsequent storage, can affect the nutritional value and sensory characteristics.

In thermal processing, the most important parameter is the level of microbial inactivation achieved. For safety reasons, the minimum holding time (residence time) should be considered for microbial inactivation, although this will give an underestimate of the true level of microbial inactivation.

In terms of microbial quality and reducing spoilage rates, the emphasis is toward that of prevention. One approach, now widely used, is that of Hazard Analysis Critical Control Points (HACCP). Here the philosophy is to identify where hazard may occur from raw materials, different processing stages, packaging, or subsequent handling and storage. Critical control points are then established. These are points in the production process where the hazard can be effectively controlled. Loss of control permits the realization of the potential hazard as an unacceptable food safety or spoilage risk.

The quality of raw materials (ingredients) also has a pronounced effect on the quality of the final product. From the microbial point of view, the ingredients must be free of serious pathogens, and have initial total bacterial counts not more than $10^4$ per gram. This reflects good hygiene in production of the ingredients. It is also useful to monitor psychotropic bacteria in raw ingredients (via direct assay of proteolytic enzymes) as they are usually predominant among the microorganisms found in pasteurized products.

Sterilization (Prior Art)

The currently practiced process for preparation of infant formulas is thermal sterilization. Table 2 shows that, at the present time, there are more than a dozen of these liquid infant formulas available in the market. Typically, these products are commercially sterile and offered in metal cans or heavy plastic containers and are stored at room temperature (i.e., they are shelf-stable). None of these infant formulas are prepared or offered as ultra-pasteurized or pasteurized product.

Sterilizing a product means exposing it to such powerful heat treatment that all microorganisms are killed. However, absolute sterility is not possible. The term "Commercial Sterility" is used instead. From the U.S. regulations point-of-view (21 CFR 113.3, 1998), "Commercial Sterility" of thermally processed food means the condition achieved—
1) By the application of heat which renders the food free of—
   (a) Microorganisms capable of reproducing in the food under normal non-refrigerated conditions of storage and distribution; and
   (b) Viable microorganisms (including spores) of public health significance; or
2) By the control of water activity and the application of heat, which renders the food free of microorganisms capable of reproducing in the food under normal non-refrigerated conditions of storage and distribution.

It is common practice in the commercial sterilization of low-acid foods (i.e., pH>4.5) to achieve at least a 12 decimal reduction for spores of *Clostridum botulinum*, because they are the most heat resistant of the major food poisoning organisms.

Two main methods are used for sterilizing liquid infant formulas: in-container sterilization, and UHT (Ultra High Temperature) treatment. For in-container sterilization, two different types of sterilizers are used: autoclaves (retorts) for batch processing, and hydrostatic towers for continuous processing. For UHT treatment, where the product is sterilized in a continuous flow followed by aseptic filling, two different types of sterilizing systems are also used. One of these methods operates on the principle of direct steam injection or steam infusion and the other on indirect heating in heat exchanger.

In the retort sterilization method, the infant formula is usually preheated and then filled into a clean can, hermetically sealed, and placed in a steam chamber and sterilized, normally at 121° C. (250° F.) for 15–40 minutes. The batch is then cooled and the retort filled with a new batch. The fact that sterilization takes place after filling eliminates the need for aseptic handling but, on the other hand, only heat resistant packaging materials can be used. In the hydrostatic tower method of in-container sterilization, the infant formula containers are slowly conveyed through successive heating and cooling zones in the sterilizer. These zones are dimensioned to correspond to the required temperatures and holding times in the various treatment stages.

In the UHT treatment, the infant formula is pumped through a closed system. On the way it is preheated, sterilized, homogenized, cooled, and filled aseptically. This method is generally understood as a treatment in which product is heated to a temperature of 135 to 150° C. in —continuous flow in a heat exchanger for a sufficient length of time to achieve commercial sterility with an acceptable amount of change in the product. From the U.S. regulations point-of-view (21 CFR 113.3, 1998), aseptic processing and packaging means the filling of a commercially sterilized cooled product into pre-sterilized containers, followed by aseptic hermetical sealing, with a pre-sterilized closure, in an atmosphere free of microorganisms. Sterilization takes place at 135–150° C. (275–300° F.) for 2–5 seconds, either by means of indirect heating, direct steam injection or infusion. All parts of the system downstream of the actual sterilization section are of aseptic design in order to eliminate the risk of reinfection.

Although bacterial enzymes do not normally survive an in-container process to cause adverse effects during subsequent storage of the product, they will survive a UHT process to a high degree to give such problems as off-flavor and gelation during storage. In the absence of some other system for inactivating the enzyme, e.g., the low temperature holding system (such as for ultra-pasteurized or pasteurized products), the only solution is to avoid these enzymes by careful control of the raw material to prevent the growth of the psychotropic organisms which give rise to these very resistant enzymes.

Aseptic filling is an integral part and a crucial step in UHT treatment. The container itself will need sterilization before filling. Cans are typically sterilized by superheated steam. Presently, most sterilized infant formulas in the market are packaged in cans.

Most packages used in the UHT processes are sterilized with hydrogen peroxide at a concentration of between 20 and 35 percent and a temperature between 80 and 85° C. Residence times of several seconds are required. Care should be taken to ensure that all hydrogen peroxide is removed, as it is a strong oxidizing agent. The oxygen permeability of the plastic is important and may well influence the shelf-life of the product.

Another term used in connection with UHT treatment to characterize the quality of the treatment is the "shelf-life" of the product. This is defined as the time which the product can be stored without the quality falling below a certain acceptable, minimum level. The concept is subjective—the shelf-life can be very long if the criteria of product quality are low. The physical and chemical limiting factors of shelf-life are gelling, increase of viscosity, sedimentation, and phase separation. The organoleptic limiting factors are deterioration of taste, smell, and color.

There is a need for a refrigerated ready-to-feed or concentrated infant formulas that do not suffer from the disadvantages of sterilized products. Such infant formulas should include all the required nutrients as listed in Table 1A or Table 1B, should be organoleptically pleasing, have a shelf-life of between about 1 and 16 weeks and use the simple and inexpensive processing of pasteurization or ultra-pasteurization. Moreover, there is a need for cost effective ready-to-feed and concentrated infant formula which can be refrigeration-stored in inexpensive packaging, such as gable top cartons or plastic containers traditionally used in milk products.

The present invention meets these and other needs, as will come apparent in the description provided below.

THE SUMMARY OF THE INVENTION

The present invention relates to refrigeration-shelf-stable ready-to-feed and concentrated complete infant formulas which have been either ultra-pasteurized or pasteurized and which are designed to include per 100 kilocalories the specified nutrients (Table 1B). The refrigerated infant formulas are refrigeration-shelf-stable products. The compositions of the present invention can optionally include non-essential but nutritionally desirable and functional components.

In one embodiment, the present invention includes refrigeration shelf-stable ready-to-feed (RTF) or concentrated infant formula being thermally treated under conditions of ultra-pasteurization or pasteurization comprising, per 100 kilocalories: from about 4.4 to about 6.4 grams of total fat; linoleic acid from about 8 to about 35 percent of total fat on weight basis; α-linolenic acid from about 1.75 to about 4 percent of total fat on weight basis; from about 1.7 to about 3.4 grams of protein; from about 1.2 to about 2 mg of Carnitine; from about 0 to about 12 mg of Taurine; from about 0 to about 16 mg of Nucleotides; from about 7 to about 30 mg of Choline; from about 4 to about 40 mg of Inositol; from about 9 to about 13 grams of carbohydrate; from about 50 to 140 mg of Calcium; from about 20 to about 70 mg of Phosphorus; from about 4 to about 17 mg of Magnesium; from about 0.2 to about 1.65 mg of Iron; from about 0.4 to about 1 mg of Zinc; from about 1 to about 100 mcg of Manganese; from about 60 to about 160 mcg of Copper; from about 8 to about 35 mcg of Iodine; from about 25 to about 50 mg of Sodium; from about 60 to about 160 mg of Potassium; from about 50 to about 160 mg of Chloride; from about 1.5 to about 5 mcg of Selenium; from about 0 to about 60 mcg of Fluoride; from about 200 to about 500 IU of Vitamin A; from about 40 to about 100 IU of Vitamin D; from about 0.5 to about 5.0 mg of Vitamin E per gram of polyunsaturated fatty acids, wherein said polyunsaturated fatty acids are from about 0.4 to about 2.5 grams; from about 1 to about 25 mcg of Vitamin K; from about 30 to about 200 mcg of Thiamine or Vitamin B1; from about 80 to about 300 mcg of Riboflavin or Vitamin B2; from about 550 to about 2000 mcg of Niacin; from about 30 to about 130 mcg of Vitamin B6; from about 0.08 to about 0.7 mcg of Vitamin B 12; from about 11 to about 40 mcg of Folic Acid or Folacin; from about 300 to about 1200 mcg of Pantothenic Acid; from about 1 to about 15 mcg of Biotin; and from about 6 to about 15 mcg of Vitamin C or Ascorbic Acid; wherein the total caloric content is from about 80 kilocalories to about 300 kilocalories per 150 milliliters or 5 fluid ounces.

The compositions of the present invention are designed to be refrigeration shelf-stable at temperatures of about 1° C. to 7° C. and preferably about 2° to about 3° C. These are conventional refrigeration temperatures for dairy products. Shelf-life for pasteurized compositions of the present invention will generally be up to about 2 weeks, and for ultra-pasteurized compositions of the present invention, the shelf-life will be between about 4 to about 16 weeks.

The refrigerated storage will preserve the overall quality of ultra-pasteurized and pasteurized compositions of the present invention better than room-temperature storage can preserve the quality of commercially available sterilized room temperature shelf-stable products. This is because the rate of all physical, chemical, and enzymatic reactions during storage are decreased at the lower temperatures. Because of the lower initial vitamins and less degradation during low temperature storage, the undesirable off-taste of vitamins are less pronounced in refrigerated products, making them organoleptically more acceptable than non-refrigerated/shelf-stable products and ensuring these components are delivered in the labeled amount to the infants.

Unlike UHT-sterilized non-refrigerated/shelf-stable products described herein, bacterial enzymes (protease and lipases) which may be present in the compositions of the present invention cause minimal adverse effects, if any, at conventional dairy refrigeration temperatures. However, in UHT-sterilized non-refrigerated/shelf-stable products, bacterial enzymes can cause off-flavor (astringent, bitterness), and thickening or gelation during storage.

Prolonged storage of sterilized products at temperatures exceeding approximately 30.5° C. (85° F.), can also cause activation of heat-sensitive spores that are not destroyed by usual heat sterilization during manufacturing. At refrigerated storage temperature(s) used for the present inventive concept, especially for relatively short times (1 to 16 weeks), there is much less risk of such a problem.

Compared to sterilized non-refrigerated/shelf-stable products, the cost of vitamin components is lower in the refrigerated shelf-stable compositions of the present invention. This is because there will be less degradation of vitamins at the refrigerated temperature of storage, as well as shorter storage time (up to 16 weeks versus up to 1.5 year), and therefore less requirement for overdosing of the vitamins in the formulation. Furthermore, since production of the inventive refrigerated pasteurized or ultra-pasteurized infant formulas will be done in the established dairy factories, usually as "piggyback products", where no capital investment is required, the cost of such production will be reasonably low. The cost of packaging of the compositions and products of the present invention is significantly lower than the cost of cans used in sterilization processes. The refrigerated distribution and sale of the infant formulas will also be done as a piggyback to dairy products, also making the distribution cost tolerable. The overall product cost of products made from the present invention will be significantly less than the cost of the sterilized non-refrigerated/shelf-stable products currently in existence.

Ultra-pasteurization and pasteurization are versatile technologies that are used in every developed and most developing countries. Refrigerated pasteurized and/or ultra-pasteurized infant formulas, prepared through these versatile technologies, can therefore easily be made locally available at all markets of the world, contributing to the improved health and nutritional status of healthy and sick infants.

Unlike regular sterilized non-refrigerated/shelf-stable products, where the primary container is a metal can, the primary container for refrigerated products of this invention is a gable top carton or plastic bottle. Compared to cans, gable top cartons and plastic bottles are lighter, take up less storage space in production plants, are more environmentally friendly, and have built-in reclosable pour spouts.

The food industry, as distinct from the infant nutrition industry, has primarily used ultra-pasteurization and pasteurization processes and has not been familiar with the more advanced and sophisticated sterilization processes used by the infant nutrition industry. For example, in infant formulas, the concentration of every single added vitamin must be calculated in a way that the effect of heat treatment and storage does not affect the label claim concentration of such vitamin. Table 6 shows the source and quantity of each vitamin added to form the inventive nutritional infant formula. Likewise, the concentration of every single added mineral must be calculated in a way that contribution of the same mineral from other ingredients does not affect the label claim concentration of such mineral. Table 7 shows the source and quantity of each mineral added to form the inventive standard infant formula. Such vitamin and mineral sources can be individually prepared as premixes for use with the inventive standard infant formula. As used herein, the term "premix" and its variants refer to ingredients that may be combined to form a constituent element of the infant formula of the present invention.

Although ultra-pasteurization and pasteurization have been used extensively for the preparation of refrigerated dairy products, no one has used these processes to prepare refrigerated pasteurized and/or ultra-pasteurized ready-to-feed or concentrated infant formulas. Compositions of the present invention can be used to supplement or substitute breast milk. The refrigerated ready-to-feed or concentrated products of the present invention are nutritionally complete and do satisfactorily meet the complete nutritional needs (including all necessary vitamins and minerals) of healthy infants, as set forth by governmental regulations, such as U.S. federal regulations (21 CFR 107.100, 1998).

DETAILED DESCRIPTION OF THE INVENTION

Definitions

Infant Formula

The term "infant formula" is not specifically defined as a regulatory definition. An infant formula, when in liquid form, may be used either directly or diluted with safe, potable, and previously boiled water before feeding, as appropriate. Infant formula should also be nutritionally adequate to promote normal growth and development when used in accordance with its directions for use. Infant formula should also be processed by physical means only and so packaged as to prevent spoilage and contamination under all normal conditions of handling, storage and distribution in the country where the product is sold.

Infant formulas are liquids or reconstituted powders fed to infants and young children. They serve as substitutes for human milk. Infant formulas have a special role to play in the diets of infants because they are often the only source of nutrients for infants. For this reason, the composition of commercial formulas is carefully controlled and is required to meet very strict standards. For purpose of the present invention, the term "infant formula" means a composition that satisfies the nutrient requirements of an infant by being a substitute for human milk. Current U.S. federal regulations state that an infant formula shall contain nutrients, as listed in Table 1A, at a level not less than the minimum level specified and not more than the maximum level specified for each 100 kilocalories of the infant formula in the form prepared for consumption. (21 CFR 107. 100, 1998). The regulations set macronutrient, essential vitamin and mineral levels in an effort to simulate the nutritional properties of human milk.

Furthermore, from the U.S. regulations point-of-view 21 CFR 107.100 provides the following should also apply to infant formulas. Vitamin E shall be present at a level of at least 0.7 International Unit of vitamin E per gram of linoleic acid. Any vitamin K added shall be in the form of phylloquinone. Vitamin $B_6$ shall be present at a level of at least 15 micrograms of vitamin $B_6$ for each gram of protein in excess of 1.8 grams of protein per 100 kilocalories of infant formula in the form prepared for consumption as directed on the container. The ratio of calcium to phosphorus in infant formula in the form prepared for consumption as directed on the container shall be no less than 11. and not more than 2.0. Protein shall be present in an amount not to exceed 4.5 grams per 100 kilocalories regardless of quality, and not less than 1.8 grams per 100 kilocalories of infant formula in the form prepared for consumption as directed on the container when its biological quality is equivalent to or better than that of casein. If the biological quality of the protein is less than that ol casein, the minimum amount of protein shall be increased proportionately to compensate for its lower biological quality. For example, an infant formula containing protein with a biological quality of 75 percent of casein shall contain at least 2.4 grams of protein (1.8/0.75). No protein with a biological quality less than 70 percent of casein shall be used.

Alternatively, from a second point-of-view, an infant formula shall contain nutrients, as listed in Table 1B, at a level not less than the minimum level specified and not more than the maximal level specified for each 100 kilocalories of the infant formula in the form prepared for consumption. (Proposed LSRO-1998 Recommendation).

Furthermore, proposed LSRO-1998 Recommendation provides the following should also apply to infant formula. The calcium to phosphorus ratio shall not be less than 1.1 and not more than 2.0. The minimum protein content is expressed in terms of α-amino nitrogen (true protein) times 6.25. Useful amino acid levels are listed in Table 1C. The energy content should be from about 63 to about 71 kcal/deciliter. The alpha-linolenic acid should from about 0.077 to about 0.256 grams. The linoleic/alpha-linolenic acid ratio should be from about 6:1 to about 16:1. Vitamin E should be from about 0.5 mg/g of PUFA to about 5.0 mg/g of PUFA.

PUFA are polyunsaturated fatty acids, such as linoleic acids, linolenic acids, arachidonic acid and the like. Furthermore, PUFA is part of the fat content and the level of PUFA in the fat content depends upon the source of the fat or oil used in the infant formula.

Moreover, during illness, water loss of an infant is often increased because of fever. Because the intake of formula during illness is usually decreased, a renal solute load can be an important consideration. Consequently, an infant formula should consider the potential renal (kidney) solute load (PRSL). The potential renal solute load can be estimated as follows:

$$PRSL = N/28 + Na + Cl + K + P_a,$$

Where N is nitrogen in mg, Na is sodium in mg, Cl is chloride in mg, K is potassium in mg, and Pa is available phosphorus (nonphytate phosphorus) in mg. The maximum value of PRSL is expressed in terms of mmol or mosol as shown below.

| Component | mg/100 kcal | mosmol/100 kcal |
| --- | --- | --- |
| Nitrogen | 540 | 19.4 |
| Sodium | 50 | 2.2 |
| Chloride | 160 | 4.6 |
| Potassium | 160 | 4.1 |
| Available Phosphorus | 70 | 2.3 |
| | | 32.6 |

Furthermore, according to 21 CFR 107.20 the label of the infant formula should bear: (21 CFR 107.20(c), 1998). "Use by" date, the blank to be filled in with the month and year selected by the manufacturer, packer, or distributor of the infant formula on the basis of tests or other information showing that the infant formula, until that date, under the conditions of handling, storage, preparation, and use prescribed by label directions, will: (1) when consumed, contain not less than the quantity of each nutrient, as set forth on its label; and (2) otherwise be of an acceptable quality (e.g., pass through an ordinary bottle nipple).

The infant formula of the present invention may be ready-to-feed (RTF). As used herein the term "ready-to-feed" refers to a formula which may be consumed without requiring additional compositional changes prior to consumption. For example, a RTF infant formula may be consumed by an infant without having to mix water or another fluid to form a properly infant drinkable formula, such as the case with powdered mixes.

The infant formula of the present invention may not be ready-to-feed and may require some preparation for use by the consumer. For example, a concentrated form of a liquid formula may require dilution with water prior to consumption by the infant. Standard dilution from a U.S. regulations point-of-view is defined as equal amounts of concentrated liquid and water (21 CFR 107.20(b), 1998). As used herein, the term "concentrated" and its variants refer to a concentrated infant formula which upon dilution with water results in the mixture meeting the nutrient specifications regulated for infant formula.

In addition, some non-required, but valuable nutritional or functional compounds (such as taurine; L-carnitine; beta-carotene; nucleotides, such as cytidine 5'-monophosphate, disodium uridine 5'-monophosphate, disodium guanosine 5'-mnonophosphate and adenosine 5'-monophosphate; emulsifiers, stabilizers, natural color, natural flavor, etc.) can be added to the formulation of infant formulas.

Ultra-Pasteurization

The first alternative process for preparation of refrigerated compositions of the present invention, and particularly in the form of ready-to-feed and concentrated infant formulas, is thermal ultra-pasteurization.

From the U.S. regulation point-of-view (21 CFR 131.3, 1998), Ultra-pasteurization (UP) when used to describe a dairy product means that such product shall have been thermally processed at or above 280° F. for at least 2 seconds, either before or after packaging, so as to produce a product which has an extended shelf-life under refrigerated conditions.

Comparison of the regulatory definition for ultra-pasteurization with the regulatory definition for aseptic processing and packaging clarifies that while ultra-pasteurized products are thermally sterilized, they should be stored under refrigerated condition. In fact storage temperature of sterilized nutritional products (room temperature) and ultra-pasteurized nutritional products (refrigerated temperature) is an important distinction between products prepared by these two processes.

The containers for packaging of liquid infant formulas and products, through the production and distribution network, must also meet certain requirements. The shape and presentation must be attractive, provide effective protection against impact, light, and heat, and be easy to open. They also must protect the product from contamination by foreign flavors or odors, be easy to carry, non-returnable (one-way), environmentally friendly, reasonably priced, and well adapted to modern production needs. At the present time, "Gable Top Cartons" are the packaging of choice for liquid dairy products and the preferred packaging to the present invention because they meet all of the above requirements. They have better handling and a built-in reclosable pour spout. They are lightweight but rugged and shatter-proof. They are convenient, easily disposable, and almost universally available. Gable top carton unformed flat blanks save valuable warehouse storage space.

Structurally, gable top cartons are made of cardboard lined with polyethylene and are generally preassembled in the plant. In order to meet certain particular requirements, more sophisticated manufacturing methods are sometimes required; for example, a thin layer of aluminum may be used to line the interior walls of the container to provide an effective barrier against oxygen penetration and provide better conservation.

Alternatively, the ultra-pasteurized and pasteurized infant formulas and products of the present invention may also be packaged in other type of containers such as plastic containers.

The refrigerated storage will preserve the quality of our ultra-pasteurized products better than room-temperature storage can preserve the quality of commercially available sterilized non-refrigerated/shelf-stable products. As previously mentioned, prolonged storage of sterilized canned products at temperatures exceeding approximately 30.5° C. (85° F.), can cause activation of heat-sensitive spores that are not destroyed by usual heat sterilization during manufacturing. See "Preventing Microbial Contamination of Enteral Formulas and Delivery System", Ross Product Division, Abbott Laboratories, Columbus, Ohio April 1996. Moreover, protease and lipase enzymes, produced by psychotropic bacteria, are markedly heat resistant and readily withstand UHT sterilization. Heat-stable enzymes are of limited importance in the spoilage of ultra-pasteurized refrigeration-shelf-stable products. These enzymes are, however, associated with age thickening or gelation in UHT products stored at room temperature. Thickening may be accompanied by the development of off-flavors, the "astringent" defect being attributed to polypeptides resulting from the breakdown of casein. Bitter flavors also develop as a result of the activity of heat-stable microbial proteases. Heat-stable lipases are not involved in structural changes but activity leads to an increase in fatty acid content of the product and acidic off-flavors.

The compositions of the present invention are designed to be refrigeration shelf-stable, i.e., at temperatures of about 1° C. to 7° C. and preferably about 2° to about 3° C. These are conventional refrigeration temperatures for dairy products. Shelf-life for pasteurized compositions of the present invention will generally be up to about 2 weeks, and for ultra-pasteurized compositions of the present invention, the shelf-life will be between about 4 to about 16 weeks.

The refrigerated storage will preserve the overall quality of ultra-pasteurized and pasteurized compositions of the present invention better than room-temperature storage can preserve the quality of commercially available sterilized room temperature shelf-stable products. This is because the rate of all physical, chemical, and enzymatic reactions during storage are decreased at the lower temperatures. Because of the lower initial vitamins and less degradation during low temperature storage, the undesirable off-taste of vitamins are less pronounced in refrigerated products, making them organoleptically more acceptable than non-refrigerated/shelf-stable products and ensuring these components are delivered in the labeled amount to the infants. As shown in Table 6, only an excess of about ten to twenty percent of a vitamin (excluding heat-labile vitamin C) is required to deliver the labeled quantity of the vitamin, and such excess quantity of the present invention is often substantially lower as compared to other available infant formulas.

Pasteurization

The second alternative process for the preparation of refrigerated compositions of the present invention is thermal pasteurization.

The International Dairy Federation has defined pasteurization (P) as a process applied to a product with the objective of minimizing possible health hazards arising from pathogenic microorganisms associated with milk, by heat treatment, which is consistent with only minimal chemical, physical, and organoleptic changes in the product. For purposes of the present invention, pasteurization will have this meaning.

From the U.S. regulation point-of-view (21 CFR 131.3, 1998), the term "pasteurized" when used to describe a dairy product means that every particle of such product shall have been heated in properly operated equipment to one of the temperatures specified in the table below and held continuously at or above that temperature for the specified time (or other time/temperature relationship which has been demonstrated to be equivalent thereto in microbial destruction):

| Temperature | Time |
|---|---|
| 145° F.[1] | 30 minutes |
| 161° F.[1] | 15 seconds |
| 191° F. | 1 second |
| 204° F. | 0.05 second |
| 212° F. | 0.01 second |

[1] If the dairy ingredient has a fat content of 10 percent or more, or if it contains added sweeteners, the above specified temperature is increased by 5° F.

The main purpose of pasteurization is the thermal killing of pathogens which are the microorganisms causing disease in humans. Pasteurized products must be entirely free from pathogens. In fact, pasteurization of milk is required by law in most countries. The traditional pathogens in raw milk are *Mycobacterium bovis* which causes bovine tuberculosis (which also affects humans), *Brucella abortus* which transmits brucellosis (undulant fever) to man, Salmonella which are responsible for gastrointestinal diseases and typhoid fevers and *Campylobacter jejuni*, a common factor in enteritis.

Apart from pathogenic microorganisms, nutritional products or milk also contains other substances and microorganisms which may spoil the taste and shelf-life of the product. A secondary purpose of pasteurization is therefore to destroy as many as possible of these other organisms and enzymatic systems in order to safeguard product quality. This requires more intensive heat treatment than is necessary to kill the pathogenic bacteria.

To ensure the destruction of all pathogenic microorganisms, it is necessary to heat the product to a given temperature and hold it at that temperature for a certain length of time before it is cooled again. The combination of temperature and holding time is very important as it determines the intensity of the heat treatment.

Intensive heat treatment of product is desirable from the microbiological point of view. But such treatment also involves a risk of adverse effects on the appearance, taste and nutritional value of the product. The choice of time/temperature combination is therefore a matter of optimization in which both microbiological effects and quality aspects must taken into account.

The original type of pasteurization was a batch process (also called Low Temperature Long Time, LTLT). The milk was heated to 63° C. in open vats and held at that temperature for 30 minutes. Nowadays pasteurization is almost always in the continuous HTST (High Temperature Short Time) process. The main advantages of HTST pasteurization is its capacity to heat-treat milk quickly and adequately while maintaining rigid bacteriological and quality control.

The actual time/temperature combination varies according to the quality of the raw materials, the type of product treated, and the required keeping properties. The combination of higher temperatures and longer times are recommended for HTST pasteurization of products with a higher content of solids. Thus, for pasteurized cream of 18% fat, the specifications are 75° C. for 15 seconds, for cream of 35% fat, 80° C. for 15 second, and for pasteurized concentrated milk (similar to infant formula products of the present invention), 80° C. for 25 seconds.

The function of each nutrient in a system not only depends on the general conditions of the system (e.g., temperature and pH), but also to a great extent on the presence or absence of other nutrients. This is because each new nutrient functions like a new chemical entity that can react with other nutrients in the system. These new reactions can include degradation of vitamins, precipitation of minerals, denaturation and crosslinking proteins, changes in hydrocolloidal behavior of carbohydrates, phase separation of the system, changes of sensory profile, and changes in nutritional bio-availability of the system.

Pasteurization and ultra-pasteurization may also be accomplished using ohmic or microwave heating.

The compositions of the present invention have been formulated such that the resultant pH is essentially neutral, e.g., about 5.5 to about 7.5. Preservation of the inventive compositions is accomplished by pasteurization and ultra-pasteurization methods and is not dependent on acidic pH for preservation.

The fat source or premix of the formulations may be any fat source or combination of fat sources which provide the desired amount of fat calories. Preferably, the fat source should be high in monounsaturated fatty acids. Fat sources may include vegetable oils, e.g., high oleic acid vegetable oils such as sunflower oil, canola oil and olive oil; safflower oil, coconut oil, cottonseed oil, corn oil or soybean oil, and medium chain triglycerides, e.g., $C_6$–$C_{12}$ triglycerides, and short chain triglycerides. In addition, butter fat and other types of oils may be used. The protein source or premix may be selected from a variety of materials, including without limitation, milk protein, whey protein, caseinate, soy protein concentrate, soy protein isolate, egg protein, gelatin, collagen and combinations thereof. For lactose-free infant formula soy protein can be used. Alternatively lactose-free skim milk (produced by hydrolyzing the lactose by lactase enzymes to glucose and galactose, or other method) can suitably be used.

Included in the protein source are lactose-free skim milk, milk protein isolate, and whey protein isolate. The milk can be selected from a group of animals consisting of cow, sheep, goat, buffalo, camel, llama, mare, deer and combinations thereof. Furthermore, the milk used in the present invention may be organic milk. As used herein, the term "organic" refers to a food, such as a milk, produced without the use of pesticides, chemical fertilizers, herbicides or fungicides. Typically, land on which milk-producing animals are raised and grains or grasses used to feed these animals should be free of these prohibited substances, e.g., pesticides, chemical fertilizers, herbicides or fungicides, for a number of years, often three years, prior to the milk being labeled as organic. Such organic milk is usually produced from animals that are substantially free of synthetic hormones, such as recombinant bovine somatotropin hormone (rbST/rBGH), and antibiotics.

When the composition is used as hypoallergenic infant formula, the protein source can also include enzymatically-hydrolyzed protein (peptides), amino acids and combinations thereof.

The amount of protein in five fluid ounces is about 1.7 to 3.4 grams. The energy contained in five fluid ounces of compositions of the present invention in the form prepared for consumption is intended to be about 100 kilo calories.

The carbohydrate source or premix useful in the present invention may be selected from a wide variety of materials such as lactose, sucrose, corn syrup solids, dextrose, glucose, fructose, honey, rock candy, maltodextrin and combinations thereof.

Artificial sweeteners such as saccharine, aspartame, asulfame K, sucrolose and their combination, as well as others, may be incorporated to enhance the organoleptic and sweetness quality of the compositions. Various fiber sources may be included in the compositions of the present invention. These sources may be selected from such materials as oat fiber, soy fiber, guar gum, pectin, soy polysaccharides, gum arabic, hydrolyzed fibers and the like. Cellulose, hemicellulose, hydrocollides, methylcellulose, carboxymethylcellulose and the like are contemplated. Also useful are fructo-oligosaccharides.

Compositions of the present invention can be formulated into a variety of different product forms. For example, a standard ready-to-feed composition is one such form of infant formula. Other forms include exempt infant formula, concentrated, lactose-free, high protein, fiber-containing, high carbohydrate, soy-based and hypoallergenic. In a preferred embodiment, the present invention includes a refrigeration-shelf-stable ready-to-feed infant formula being thermally treated under conditions of pasteurization or ultra-pasteurization comprising, having from about 80 to about 300 kilocalories per five fluid ounces and having sufficient nutrients, vitamins and minerals as regulated for infant formula.

In a desirable aspect, the present invention includes refrigeration shelf-stable ready-to-feed (RTF) or concentrated infant formula being thermally treated under conditions of ultra-pasteurization or pasteurization comprising, per 100 kilocalories: from about 4.4 to about 6.4 grams of total fat; linoleic acid from about 8 to about 35 percent of total fat on weight basis; α-linolenic acid from about 1.75 to about 4 percent of total fat on weight basis; from about 1.7 to about 3.4 grams of protein; from about 1.2 to about 2 mg of Carnitine; from about 0 to about 12 mg of Taurine; from about 0 to about 16 mg of Nucleotides; from about 7 to about 30 mg of Choline; from about 4 to about 40 mg of Inositol; from about 9 to about 13 grams of carbohydrate; from about 50 to 140 mg of Calcium; from about 20 to about 70 mg of Phosphorus; from about 4 to about 17 mg of Magnesium; from about 0.2 to about 1.65 mg of Iron; from about 0.4 to about 1 mg of Zinc; from about 1 to about 100 mcg of Manganese; from about 60 to about 160 mcg of Copper; from about 8 to about 35 mcg of Iodine; from about 25 to about 50 mg of Sodium; from about 60 to about 160 mg of Potassium; from about 50 to about 160 mg of Chloride; from about 1.5 to about 5 mcg of Selenium; from about 0 to about 60 mcg of Fluoride; from about 200 to about 500 IU of Vitamin A; from about 40 to about 100 IU of Vitamin D; from about 0.5 to about 5.0 mg of Vitamin E per gram of polyunsaturated fatty acids, wherein said polyunsaturated fatty acids are from about 0.4 to about 2.5 grams; from about 1 to about 25 mcg of Vitamin K, from about 30 to about 200 mcg of Thiamine or Vitamin B 1; from about 80 to about 300 mcg of Riboflavin or Vitamin B2; from about 550 to about 2000 mcg of Niacin; from about 30 to about 130 mcg of Vitamin B6; from about 0.08 to about 0.7 mcg of Vitamin B 12; from about 11 to about 40 mcg of Folic Acid or Folacin; from about 300 to about 1200 mcg of Pantothenic Acid; from about 1 to about 15 mcg of Biotin; and from about 6 to about 15 mcg of Vitamin C or Ascorbic Acid; wherein the total caloric content is from about 80 kilocalories to about 300 kilocalories per 150 milliliters or fluid ounces. Alternatively, the infant formula can be made without iron fortification, e.g., without addition of an iron source such as ferrous sulfate.

Nucleotides include cytidine 5'-monophosphate, disodium uridine monophosphate, disodium guanosine 5'-monophosphate, adenosine 5'-monophosphate and the like.

Antioxidants useful in the present invention include, without limitation, butylhydroxy anisole (BHA), butylhydroxy toluene (BHT), tertiary butyl hydroquinone (TBHQ), propyl gallate and combinations thereof. Natural antioxidants can also be included through additional amounts of vitamin C, E, beta-carotene, selenium, zinc and combinations thereof. Various herbs, herb extracts, botanicals, botanical extracts, amino acids and the like, and combinations thereof, can also be included for their intended functions and various products using such dietary supplements can be formulated therefrom.

Various non-nutritive components can be included in the inventive compositions. For example, fillers, thickeners (e.g., carrageenan), natural colors, natural flavors, emulsifiers (e.g., soy lecithin), stabilizers and the like are useful.

Various nutraceuticals and phytochemicals can be incorporated into the inventive compositions for their intended function and as a treatment for infants with specific disorders. The standard formulation as set forth in the Table 3 can be augmented with a variety of additional components to specially tailor the composition as an exempt infant formula. Various specialized products can be formulated. For example when the composition is to be used as a food for special dietary use, it can be formulated into a hypoallergenic infant formula that contains hydrolyzed proteins. Other foods for special dietary use include infant who have inborn errors of metabolism or low birth weight, or who have otherwise have unusual medical or dietary problems. As used herein, the term "exempt infant formula" means an infant formula which is represented and labeled for use by an infant who has an inborn error of metabolism or low birth weight or who otherwise has an unusual medical or dietary problem, where the infant formula complies with regulations, e.g., 21 CFR 107.50, 1998, as prescribed for such exempt infant formulas.

The compositions of the present invention are intended to be stored at refrigerated temperatures in standard gable top cartons, plastic containers or the like.

EXAMPLES

Batching and Processing Procedure:

Proper batching is of utmost importance. For preparation of all pasteurized and/or ultra-pasteurized infant formulas, the total processing system was cleaned (CIP=Clean-In-Place).

For the preparation of all pasteurized and/or ultra-pasteurized infant formulas, high quality, food-grade ingredients were used. Order of addition of ingredients, their physical structure, temperature, and rate of addition are also very important.

Water was the first ingredient to be introduced into the batching container. Although the batch volume could be adjusted at the end of the batching process, it is preferred that the amount of water is precalculated in a way that addition of other ingredients automatically brings the volume of the batch to the desirable level. Next, nonfat milk is introduced into the batching container.

Proteins, fats, carbohydrates, minerals, vitamins, nucleotides and other desirable ingredients are added sequentially. After the addition of each ingredient, the composition was thoroughly mixed before the next ingredient was added to the system.

Upon obtaining a homogeneous batch of unprocessed infant formula with desirable profile of nutrients and functional ingredients, the batch is immediately pasteurized (85° C. for 30 seconds) and/or ultra-pasteurized (135–150° C. for up to 5 seconds). The pasteurized and/or ultra-pasteurized infant formula is promptly cooled, and continuously kept at refrigerated temperature (1–7° C., preferably 2–3° C.).

Example 1A

Pursuing the batching and processing guidelines explained above, and as further detailed in Table 4 the inventive refrigerated ready-to-feed (RTF) pasteurized and/or ultra-pasteurized infant formulas were developed. Vitamins and minerals are added per Guidelines in Tables 6 and 7. The ingredients, premixes, batching conditions and process conditions are shown below in Tables 8 and 9.

Example 1B

Pursuing the batching and processing guidelines explained above, and as further detailed in Table 4 the inventive refrigerated ready-to-feed (RTF) pasteurized and/or ultra-pasteurized infant formulas were developed. Vitamins and minerals are added per guidelines in Tables 6 and 7. The ingredients, premixes, batching conditions and process conditions are shown below in Tables 10 and 11.

Example 2A

Pursuing the batching and processing guidelines explained above, and as further detailed in Table 5 the inventive refrigerated, concentrated, pasteurized and/or ultra-pasteurized infant formulas were developed. Vitamins and minerals are added per guidelines in Tables 6 and 7. The ingredients, premixes, batching conditions and process conditions are shown below in Tables 12 and 13. After standard dilution by the consumer (equal amounts of concentrated infant formula and water), the nutritional profile of the product is identical to the RTF infant formula.

Example 2B

Pursuing the batching and processing guidelines explained above, and as further detailed in Table 5 the inventive refrigerated, concentrated, pasteurized and/or ultra-pasteurized infant formulas were developed. Vitamins and minerals are added per guidelines in Tables 6 and 7. The ingredients, premixes, batching conditions and process conditions are shown below in Tables 14 and 15. After standard dilution by the consumer (equal amounts of concentrated infant formula and water), the nutritional profile of the product is identical to the RTF infant formula.

Although this invention has certain preferred embodiments, it will be obvious to those skilled in the art that various changes and modifications may be made therein without departing from the invention, and all such changes and modifications are intended to fall within the true spirit and scope of the invention.

TABLE 1A

Nutrient Specification of Infant Formula in the Form Prepared for Consumption According to the Code of Federal Regulations. (21 CFR 107.100, 1998) Per 100 kilocalories (5 fl oz)

| Code of Fed. Regulations REQUIRED NUTRIENTS | Unit of Measurement | MINIMUM LEVEL | MAXIMUM LEVEL |
|---|---|---|---|
| Protein | g | 1.8 | 4.5 |
| Fat | g | 3.3 | 6 |
| Percent Calories | | 30 | 54 |
| Carbohydrate | g | | |
| Water | g | | |
| Linoleic acid | mg | 300 | |
| Percent Calories | | 2.7 | |
| Vitamins: | | | |
| Vitamin A | IU | 250 | 750 |
| Vitamin D | IU | 40 | 100 |
| Vitamin E | IU | 0.7 | |
| Vitamin K | mcg | 4 | |
| Thiamine (Vitamin B1) | mcg | 40 | |

TABLE 1A-continued

Nutrient Specification of Infant Formula in the Form Prepared for Consumption According to the Code of Federal Regulations. (21 CFR 107.100, 1998) Per 100 kilocalories (5 fl oz)

| Code of Fed. Regulations REQUIRED NUTRIENTS | Unit of Measurement | MINIMUM LEVEL | MAXIMUM LEVEL |
|---|---|---|---|
| Riboflavin (Vitamin B2) | mcg | 60 | |
| Vitamin B6 | mcg | 35 | |
| Vitamin B12 | mcg | 0.15 | |
| Niacin | mcg | 250 | |
| Folic acid (Folacin) | mcg | 4 | |
| Pantothenic acid | mcg | 300 | |
| Biotin | mcg | 1.5 | |
| Vitamin C (Ascorbic Acid) | mg | 8 | |
| Choline | mg | 7 | |
| Inositol | mg | 4 | |
| Minerals: | | | |
| Calcium | mg | 60 | |
| Phosphorus | mg | 30 | |
| Magnesium | mg | 6 | |
| Iron | mg | 0.15 | 3 |
| Zinc | mg | 0.5 | |
| Manganese | mcg | 5 | |
| Copper | mcg | 60 | |
| Iodine | mcg | 5 | 75 |
| Sodium | mg | 20 | 60 |
| Potassium | mg | 80 | 200 |
| Chloride | mg | 55 | 150 |

TABLE 1B

Nutrient Specification of Infant Formula in the Form Prepared for Consumption According to the Life Sciences Research Office (LSRO), 1998, Per 100 kilocalories (or approximately 150 ml or 5 fluid ounces)

| Nutrients | Unit | MINIMUM | MAXIMUM |
|---|---|---|---|
| Energy | kcal/dL | 63 | 71 |
| Total Fat | g | 4.4 | 6.4 |
| Total Fat as Percent of Energy | % of Energy | 40 | 57.2 |
| Essential Fats | | | |
| Linoleic acid | % of Total Fat | 8 | 35 |
| α-Linolenic acid | % of Total Fat | 1.75 | 4.0 |
| Linoleic acid to α-Linolenic acid | ratio | 16:1 | 6:1 |
| Protein | g | 1.7 | 3.4 |
| Carnitine | mg | 1.2 | 2.0 |
| Taurine | mg | 0 | 12 |
| Nucleotides | mg | 0 | 16 |
| Choline | mg | 7 | 30 |
| Inositol | mg | 4 | 40 |
| Total Carbohydrate | g | 9 | 13 |
| Minerals: | | | |
| Calcium | mg | 50 | 140 |
| Phosphorus | mg | 20 | 70 |
| Magnesium | mg | 4 | 17 |
| Iron | mg | 0.2 | 1.65 |
| Zinc | mg | 0.4 | 1.0 |
| Manganese | mcg | 1.0 | 100 |
| Copper | mcg | 60 | 160 |
| Iodine | mcg | 8 | 35 |
| Sodium | mg | 25 | 50 |
| Potassium | mg | 60 | 160 |
| Chloride | mg | 50 | 160 |
| Selenium | mcg | 1.5 | 5.0 |
| Fluoride | mcg | 0 | 60 |
| Vitamins: | | | |
| Vitamin A | IU | 200 | 500 |
| Vitamin D | IU | 40 | 100 |
| Vitamin E | mg/g PUFA | 0.5 | 5.0 |

TABLE 1B-continued

Nutrient Specification of Infant Formula in the Form Prepared for Consumption According to the Life Sciences Research Office (LSRO), 1998, Per 100 kilocalories (or approximately 150 ml or 5 fluid ounces)

| Nutrients | Unit | MINIMUM | MAXIMUM |
| --- | --- | --- | --- |
| Vitamin K | mcg | 1 | 25 |
| Thiamine (Vitamin B1) | mcg | 30 | 200 |
| Riboflavin (Vitamin B2) | mcg | 80 | 300 |
| Niacin | mcg | 550 | 2000 |
| Vitamin B6 | mcg | 30 | 130 |
| Vitamin B12 | mcg | 0.08 | 0.7 |
| Folic acid (Folacin) | mcg | 11 | 40 |
| Pantothenic acid | mcg | 300 | 1200 |
| Biotin | mcg | 1.0 | 15 |
| Vitamin C (Ascorbic Acid) | mg | 6 | 15 |

TABLE 1C

Essential amino acids

| | Content (mg/100 kcal) | |
| --- | --- | --- |
| Amino Acid | Minimum | Maximum |
| Isoleucine | 88 | 176 |
| Leucine | 171 | 342 |
| Lysine | 124 | 248 |
| Methionine + Cysteine | 58 | 116 |

TABLE 1C-continued

Essential amino acids

| | Content (mg/100 kcal) | |
| --- | --- | --- |
| Amino Acid | Minimum | Maximum |
| Phenylalanine + Tyrosine | 133 | 266 |
| Threonine | 77 | 154 |
| Tryptophan | 26 | 52 |
| Valine | 90 | 180 |

TABLE 2

Examples of Commercially Available Shelf Stable Sterilized Ready-To-Feed and Concentrated Infant Formula with and/or Without Iron

| Company | Product (s) |
| --- | --- |
| STANDARD FORMULA | |
| Ross | Similac ® |
| Mead Johnson | Enfamil ®, Next Step ® |
| Wyeth-Ayerst | SMA ® |
| Gerber | Gerber ® Formula |
| Nestle (Carnation) | Follow-Up ™ |
| SOY & HYDROLYZED INFANT FORMULA | |
| Ross | Isomil ® Soy Formula, Alimentum ® Protein Hydrolzate, Isomil ®/DF, Similac ® PM 60/40 |
| Mead Johnson | ProSobee ® Soy, Nutramigen ® Protein Hydrolyzate, LactoFree ®, Pregestimil ® |
| Wyeth-Ayerst | Nursoy ® |
| Nestle (Carnation) | Good Start ®, Alsoy ® |

TABLE 3

Nutritional Composition of Ultra-Pasteurized (UP) or Pasteurized (P) Ready-To-Feed (RTF) Infant Formula with Iron in Comparison to the Code of Federal Regulations. Per 100 kilocalories (5 fl oz)

| Code of Fed. Regulations REQUIRED NUTRIENTS | Unit of Measurement | MINIMUM LEVEL | MAXIMUM LEVEL | Standard RTF Refrigerated UP of P Infant Formula |
| --- | --- | --- | --- | --- |
| Protein | g | 1.8 | 4.5 | 2.1 |
| Fat | g | 3.3 | 6 | 5.3 |
| Percent Calories | | 30 | 54 | |
| Carbohydrate | g | | | 10.9 |
| Water | g | | | 134 |
| Linoleic acid | mg | 300 | | 1000 |
| Percent Calories | | 2.7 | | |
| Vitamins: | | | | |
| Vitamin A | IU | 250 | 750 | 300 |
| Vitamin D | IU | 40 | 100 | 60 |
| Vitamin E | IU | 0.7 | | 3 |
| Vitamin K | mcg | 4 | | 8 |
| Thiamine (Vitamin B1) | mcg | 40 | | 100 |
| Riboflavin (Vitamin B2) | mcg | 60 | | 150 |
| Vitamin B6 | mcg | 35 | | 60 |
| Vitamin B12 | mcg | 0.15 | | 0.3 |
| Niacin | mcg | 250 | | 1050 |
| Folic acid (Folacin) | mcg | 4 | | 16 |
| Pantothenic acid | mcg | 300 | | 500 |
| Biotin | mcg | 1.5 | | 4.4 |
| Vitamin C (Ascorbic Acid) | mg | 8 | | 12 |
| Choline | mg | 7 | | 16 |
| Inositol | mg | 4 | | 6 |
| Minerals: | | | | |
| Calcium | mg | 60 | | 78 |
| Phosphorus | mg | 30 | | 53 |
| Magnesium | mg | 6 | | 8 |

TABLE 3-continued

Nutritional Composition of Ultra-Pasteurized (UP) or Pasteurized (P) Ready-To-Feed (RTF) Infant Formula with Iron in Comparison to the Code of Federal Regulations.
Per 100 kilocalories (5 fl oz)

| Code of Fed. Regulations REQUIRED NUTRIENTS | Unit of Measurement | MINIMUM LEVEL | MAXIMUM LEVEL | Standard RTF Refrigerated UP of P Infant Formula |
|---|---|---|---|---|
| Iron | mg | 0.15 | 3 | 1.8 |
| Zinc | mg | 0.5 | | 1 |
| Manganese | mcg | 5 | | 15 |
| Copper | mcg | 60 | | 90 |
| Iodine | mcg | 5 | 75 | 10 |
| Sodium | mg | 20 | 60 | 27 |
| Potassium | mg | 80 | 200 | 108 |
| Chloride | mg | 55 | 150 | 65 |

TABLE 4

Development of the Base of Ready-To-Feed (RTF) Ultra-Pasteurized (UP) or Pasteurized (P) Infant Formula from Cow's Skim Milk

| | Composition | |
|---|---|---|
| Description | Protein | Lactose |
| Desirable RTF Infant Formula | 14.2 (g/l) | 73.68 (g/l) |
| Cow Milk[1] | 34 (g/l) | 48 (g/l) |
| Starting Ratio cow/infant formula | 2.39 | 0.65 |
| Add water to 1 liter of cow milk | 1.39 Liters | |
| Half way Ratio of cow/RTF infant formula | 1 | 0.27 |
| Add lactose to the resultant 2.39 liters of (cow milk + water) | | 128.1 g |
| Final Ratio of cow/RTF infant formula | 1 | 1 |
| Add appropriate quantity of desirable fats, vitamins & minerals, and other necessary or desirable ingredients | | |
| Process (UP or P including Homogenization), package and store at refrigerated temperatures | | |

[1]Alan Varnam & Jane Sutherland Milk and Milk Products, Technology, Chemistry and Microbiology Chapman & Hall, New York, NY 1994

TABLE 5

Development of the Base of Concentrated Ultra-Pasteurized (UP) or Pasteurized (P) Infant Formula from Cow's Skim Milk

| | Composition | |
|---|---|---|
| Description | Protein | Lactose |
| Desirable[2] Concentrated Infant Formula | 28.4 (g/l) | 147.36 (g/l) |
| Cow Milk[3] | 34 (g/l) | 48 (g/l) |
| Starting Ratio cow/infant formula | 1.197 | 0.326 |
| Add water to 1 liter of cow milk | 0.197 Liters | |
| Half way Ratio of cow/Conc. infant formula | 1 | 0.275 |
| Add lactose to the resultant 1.197 liters of (cow milk + water) | | 128.4 g |
| Final Ratio of cow/Conc. infant formula | 1 | 1 |
| Add appropriate quantity (2 times of RTF formula) of desirable fats, vitamins & minerals, and other necessary or desirable ingredients | | |
| Process (UP or P including Homogenization), package and store at refrigerated temperatures. | | |

[2]According to CFR: "Standard dilution is equal amounts of concentrated liquid and water"
[3]Alan Varnam & Jane Sutherland Milk and Milk Products, Technology, Chemistry and Microbiology Chapman & Hall, New York, NY 1994

TABLE 6

Source and Quantity of Added Vitamins to be Used with the RTF Ultra-Pasteurized or Pasteurized Infant Formula from Cow's Skim Milk

| Vitamin Premix | Units | Label Claim, Units/liter | Food-Grade Source/Compound | Source to Vitamin Conversion Factor | Processing & Storage Overdose |
|---|---|---|---|---|---|
| Vitamins: | | | | | |
| Vitamin A | IU | 2028 | Vitamin A Palmitate | 1.9 | 1.2 |
| Vitamin D | IU | 405.6 | Vitamind D3 (cholecalciferol) | 1 | 1.2 |
| Vitamin E | IU | 20.28 | Alpha-tocopheryl acetate | 1 | 1.2 |
| Vitamin K | mcg | 54.08 | Phylloquinone (phytonadione) | 1 | 1.1 |
| Thiamine (Vitamin B1) | mcg | 676 | Thiamin monoitrate | 1 | 1.2 |
| Riboflavin (Vitamin B2) | mcg | 1014 | Riboflavin | 1 | 1.2 |
| Vitamin B6 | mcg | 405.6 | Pyridoxine hydrochloride | 1.21 | 1.2 |
| Vitamin B12 | mcg | 2.03 | Cyanocobalamin | 1 | 1.2 |
| Niacin | mcg | 7098 | Niacinamide | 1 | 1.1 |
| Folic acid (Folacin) | mcg | 108.16 | Folic Acid | 1 | 1.2 |
| Pantothenic acid | mcg | 3380 | Calcium Pantothenate | 1.09 | 1.2 |
| Biotin | mcg | 29.74 | Biotin | 1 | 1.2 |
| Vitamin C (Ascorbic Acid) | mg | 81.12 | Sodium Ascorbate | 1.12 | 2 |
| Choline | mg | 81.12 | Choline bitartarate | 3.71 | 1.1 |
| Inositol | mg | 81.12 | m-inositol | 1 | 1.1 |

TABLE 6-continued

Source and Quantity of Added Vitamins to be Used with the RTF Ultra-Pasteurized or Pasteurized Infant Formula from Cow's Skim Milk

| Vitamin Premix | Units | Label Claim, Units/liter | Food-Grade Source/Compound | Source to Vitamin Conversion Factor | Processing & Storage Overdose |
|---|---|---|---|---|---|
| Taurine | mg | 540 | Taurine | 1 | 1.1 |
| L-carnitine | mg | 32.8 | L-carnitine | 1 | 1.1 |

TABLE 7

Source and Quantity of Added Minerals to be Used with the RTF Ultra-Pasteurized or Pasteurized Infant Formula from Cow's Skim Milk

| Mineral Premix | Units | Label Claim, Units/Liter | Food-Grade Source/Compound | Source to Mineral Conversion Factor | Processing & Storage Overdose Factor |
|---|---|---|---|---|---|
| Minerals: | | | | | |
| Calcium | mg | 527.28 | | | |
| Phosphorus | mg | 377 | | | |
| Magnesium | mg | 54.08 | Magnesium Chloride (MgCl$_2$.6H$_2$O) | 8.47 | |
| Iron | mg | 12.17 | Ferrous Sulfate (FeSO$_4$.7H$_2$O) | 4.98 | 1 |
| Zinc | mg | 6.67 | Zinc Sulfate (ZnSO$_4$.1H$_2$O) | 2.76 | 1 |
| Manganese | mcg | 101.4 | Maganese Sulfate (MnSO$_4$.1H$_2$O) | 3.07 | 1 |
| Copper | mcg | 608.4 | Cupric Sulfate (CuSO$_4$), anhydrous | 2.51 | 1 |
| Iodine | mcg | 67.6 | Potassium Iodide (KI), anhydrous | 1.31 | 1 |
| Sodium | mg | 230 | | | |
| Potassium | mg | 730.08 | | | |
| Chloride | mg | 439.4 | | | |

TABLE 8

Ingredient/Premix Preparation of Ready-To-Feed (RTF) Infant Formula Example 1A

| Ingredient/Premix | Units | Batch/ 1 Liter |
|---|---|---|
| Whey Protein Concentrate | G | 0.88 |
| Protein Premix | G | 0.88 |
| Canola Oil | G | 32.25 |
| Soy Lecithin | G | 3.58 |
| Fat Premix | G | 35.83 |
| Lactose | G | 57.72 |
| Carrageenan | G | 0.22 |
| Carbohydrate Premix | G | 57.74 |
| Mineral Premix | g | 2 |
| MgCl$_2$ | g | 0.051 |
| Mineral Premix and Balance | g | 2.051 |
| Vitamin Premix | g | 1 |
| cytidine 5'-monophosphate | g | 0.008 |
| disodium uridine 5'monophosphate | g | 0.008 |
| disodium guanosine 5'monophosphate | g | 0.008 |
| adenosine 5'monophosphate | g | 0.008 |
| Nucleotide Premix | g | 0.032 |

Water: Amount of water per liter of Infant Formula (i.e., 1.39 L water/2.39 L water + skim Milk) according to calculation based on protein and lactose may be reduced to meet the label claim for amount of water. This is due to volume obtained by other ingredients in the system.

TABLE 9

Batching and Processing Procedure for the Preparation of Ready-To-Feed (RTF) Infant Formula
Example 1A

| Ingredient/Premix | Units | Batch/ 1 Liter | Pre-Batching Condition | Batching Process Condition |
|---|---|---|---|---|
| | | | CIP the total system | |
| Water | ml | 391.3 | Warm (70° C.) | Add to the batching tank |
| Nonfat Milk | ml | 397.1 | Warm (70° C.) | Mix to uniformity |
| Protein Premix | g | 0.88 | Well-mixed | Mix to uniformity |
| Fat Premix | g | 35.83 | Well-mixed, Warm (70° C.) | Mix to uniformity |
| Carbohydrate Premix | g | 57.74 | Well-mixed | Mix to uniformity |
| Mineral Premix & Balance | g | 2.051 | Dissolve in 100 ml WARM water | Homogenize & Mix to uniformity |
| Vitamin Premix | g | 1 | Dissolve in 50 ml COLD Water | Mix to uniformity |
| Nucleotide Premix | g | 0.032 | Add to the vitamin premix | |
| Water, IF NEEDED | | to 1 Liter | Room Temperature | Mix & Blend PASTEURIZE: Heat (center of product to 85° C. for 30 seconds), cool immediately |

TABLE 10

Ingredient/Premix Preparation of Ready-To-Feed (RTF) Infant Formula with Dextrose
Example 1B

| Ingredient/Premix | Units | Batch/ 1 Liter |
|---|---|---|
| Whey Protein Concentrate | g | 0.88 |
| Protein Premix | g | 0.88 |
| Canola Oil | g | 32.25 |
| Soy Lecithin | g | 3.58 |
| Fat Premix | g | 35.83 |
| Lactose | g | 29.02 |
| Dextrose | g | 28.5 |
| Carrageenan | g | 0.22 |
| Carbohydrate Premix | g | 57.74 |
| Mineral Premix | g | 2 |
| MgCl$_2$ | g | 0.051 |
| Mineral Premix and Balance | g | 2.051 |
| Vitamin Premix | g | 1 |
| Cytidine 5'monophosphate | g | 0.008 |
| Disodium uridine 5'monophosphate | g | 0.008 |
| Disodium guanosine 5'monophosphate | g | 0.008 |
| Adenosine 5'monophosphate | g | 0.008 |
| Nucleotide Premix | g | 0.032 |

Water: Amount of water per liter of Infant Formula (i.e., 1.39 L water/2.39 L water + skim Milk) according to calculation based on protein and lactose may be reduced to meet the label claim for amount of water. This is due to volume occupied by other ingredients in the system.

TABLE 11

Batching and Processing Procedure for the Preparation of Ready-To-Feed (RTF) Infant Formula with Dextrose
Example 1B

| Ingredient/Premix | Units | Batch/ 1 Liter | Pre-Batching Condition | Batching Process Condition |
|---|---|---|---|---|
| | | | CIP the total system | |
| Water | ml | 391.3 | Warm (70° C.) | Add to the batching tank |
| Nonfat Milk | ml | 397.1 | Warm (70° C.) | Mix to uniformity |
| Protein Premix | g | 0.88 | Well-mixed | Mix to uniformity |
| Fat Premix | g | 35.83 | Well-mixed, Warm (70° C.) | Mix to uniformity |
| Carbohydrate Premix | g | 57.74 | Well-mixed | Mix to uniformity |

TABLE 11-continued

Batching and Processing Procedure for the Preparation of Ready-To-Feed (RTF) Infant Formula with Dextrose
Example 1B

| Ingredient/Premix | Units | Batch/ 1 Liter | Pre-Batching Condition | Batching Process Condition |
|---|---|---|---|---|
| Mineral Premix & Balance | g | 2.051 | Dissolve in 100 ml WARM water | Homogenize & Mix to uniformity |
| Vitamin Premix | g | 1 | Dissolve in 50 ml COLD Water | Mix to uniformity |
| Nucleotide Premix | g | 0.032 | Add to the vitamin premix | |
| Water, IF NEEDED | | to 1 Liter | Room Temperature | Mix & Blend PASTEURIZE: Heat (center of product to 85° C. for 30 seconds), cool immediately |

TABLE 12

Ingredient/Premix Preparation of Concentrated Infant Formula
Example 2A

| Ingredient/Premix | Units | Batch/ 1 Liter |
|---|---|---|
| Whey Protein Concentrate | g | 1.76 |
| Protein Premix | g | 1.76 |
| Canola Oil | g | 64.5 |
| Soy Lecithin | g | 7.16 |
| Fat Premix | g | 71.66 |
| Lactose | g | 115.04 |
| Carrageenan | g | 0.22 |
| Carbohydrate Premix | g | 115.26 |
| Mineral Premix | g | 4 |
| MgCl$_2$ | g | 0.102 |
| Mineral Premix and Balance | g | 4.102 |
| Vitamin Premix | g | 2 |
| Cytidine 5'monophosphate | g | 0.016 |
| Disodium uridine 5'monophosphate | g | 0.016 |
| Disodium guanosine 5'monophosphate | g | 0.016 |
| Adenosine 5'monophosphate | g | 0.016 |
| Nucleotide Premix | g | 0.064 |

Water: Amount of water per liter of Infant Formula (i.e., 0.197 L water/ 1.197 L water + skim Milk) according to calculation based on protein and lactose may be reduced to meet the label claim for amount of water. This is due to volume occupied by other ingredients in the system.

TABLE 13

Batching and Processing Procedure for the Preparation of Concentrated Infant Formula
Example 2A

| Ingredient/Premix | Units | Batch/ 1 Liter | Pre-Batching Condition | Batching Process Condition |
|---|---|---|---|---|
| | | | CIP the total system | |
| Nonfat Milk | ml | 794.2 | Warm (70° C.) | Add to the batching tank |
| Protein Premix | g | 1.76 | Well-mixed | Mix to uniformity |
| Fat Premix | g | 71.66 | Well-mixed, Warm (70° C.) | Mix to uniformity |
| Carbohydrate Premix | g | 115.26 | Well-mixed | Mix to uniformity |
| Mineral Premix & Balance | g | 4.102 | Dissolve in 41.2 ml WARM water | Homogenize & Mix to uniformity |
| Vitamin Premix | g | 2 | Dissolve in 41.2 ml COLD Water | Mix to uniformity |
| Nucleotide Premix | g | 0.064 | Add to the vitamin premix | |
| Water, IF NEEDED | | to 1 Liter | Room Temperature | Mix & Blend PASTEURIZE: Heat (center of product to 85° C. for 30 seconds), cool immediately |

TABLE 14

Ingredient/Premix Preparation of Concentrated Infant Formula with Dextrose
Example 2B

| Ingredient/Premix | Units | Batch/ 1 Liter |
|---|---|---|
| Whey Protein Concentrate | g | 1.76 |
| Protein Premix | g | 1.76 |
| Canola Oil | g | 64.5 |
| Soy Lecithin | g | 7.16 |
| Fat Premix | g | 71.66 |
| Lactose | g | 58.04 |
| Dextrose | g | 57 |
| Carrageenan | g | 0.22 |
| Carbohydrate Premix | g | 115.26 |
| Mineral Premix | g | 4 |
| MgCl$_2$ | g | 0.102 |
| Mineral Premix and Balance | g | 4.102 |
| Vitamin Premix | g | 2 |
| Cytidine 5'monophosphate | g | 0.016 |
| Disodium uridine 5'monophosphate | g | 0.016 |
| Disodium guanosine 5'monophosphate | g | 0.016 |
| Adenosine 5'monophosphate | g | 0.016 |
| Nucleotide Premix | g | 0.064 |

Water: Amount of water per liter of Infant Formula (i.e., 0.197 L water/ 1.197 L water + skim Milk) according to calculation based on protein and lactose may be reduced to meet the label claim for amount of water. This is due to volume occupied by other ingredients in the system.

TABLE 15

Batching and Processing Procedure for the Preparation of Concentrated Infant Formula with Dextrose
Example 2B

| Ingredient/Premix | Units | Batch/ 1 Liter | Pre-Batching Condition | Batching Process Condition |
|---|---|---|---|---|
| | | | CIP the total system | |
| Nonfat Milk | ml | 794.2 | Warm (70° C.) | Mix to uniformity |
| Protein Premix | g | 1.76 | Well-mixed | Mix to uniformity |
| Fat Premix | g | 71.66 | Well-mixed, Warm (70° C.) | Mix to uniformity |
| Carbohydrate Premix | g | 115.26 | Well-mixed | Mix to uniformity |
| Mineral Premix & Balance | g | 4.102 | Dissolve in 41.2 ml WARM water | Homogenize & Mix to uniformity |
| Vitamin Premix | g | 2 | Dissolve in 41.2 ml COLD Water | Mix to uniformity |
| Nucleotide Premix | g | 0.064 | Add to the vitamin premix | |
| Water, IF NEEDED | | to 1 Liter | Room Temperature | Mix & Blend PASTEURIZE: Heat (center of product to 85° C. for 30 seconds), cool immediately |

What is claimed is:

1. A refrigeration-shelf-stable infant formula being thermally treated under conditions of ultra-pasteurization or pasteurization having a nutritional composition comprising per 100 kilocalories:

a. from about 4.4 to about 6.4 grams of total fat;
   b. linoleic acid from about 8 to about 35 percent of total fat on weight basis;
   c. α-linolenic acid from about 1.75 to about 4 percent of total fat on weight basis;
   d. from about 1.7 to about 3.4 grams of protein;
   e. from about 1.2 to about 2 mg of Carnitine;
   f. from about 0 to about 12 mg of Taurine;
   g. from about 0 to about 16 mg of Nucleotides;
   h. from about 7 to about 30 mg of Choline;
   i. from about 4 to about 40 mg of Inositol;
   j. from about 9 to about 13 grams of carbohydrate;
   k. from about 50 to 140 mg of Calcium;
   l. from about 20 to about 70 mg of Phosphorus;
   m. from about 4 to about 17 mg of Magnesium;
   n. from about 0.2 to about 1.65 mg of Iron;
   o. from about 0.4 to about 1 mg of Zinc;
   p. from about 1 to about 100 mcg of Manganese;
   q. from about 60 to about 160 mcg of Copper;
   r. from about 8 to about 35 mcg of Iodine;
   s. from about 25 to about 50 mg of Sodium;
   t. from about 60 to about 160 mg of Potassium;
   u. from about 50 to about 160 mg of Chloride;
   v. from about 1.5 to about 5 mcg of Selenium;
   w. from about 0 to about 60 mcg of Fluoride;
   x. from about 200 to about 500 IU of Vitamin A;
   y. from about 40 to about 100 IU of Vitamin D;
   z. from about 0.5 to about 5.0 mg of Vitamin E per gram of polyunsaturated fatty acids, wherein said polyunsaturated fatty acids are from about 0.4 to about 2.5 grams;
   aa. from about 1 to about 25 mcg of Vitamin K;
   bb. from about 30 to about 200 mcg of Thiamine or Vitamin B I;
   cc. from about 80 to about 300 mcg of Riboflavin or Vitamin B2;
   dd. from about 550 to about 2000 mcg of Niacin;
   ee. from about 30 to about 130 mcg of Vitamin B6;
   ff. from about 0.08 to about 0.7 mcg of Vitamin B12;
   gg. from about 11 to about 40 mcg of Folic Acid or Folacin;
   hh. from about 300 to about 1200 mcg of Pantothenic Acid:
   ii. from about 1 to about 15 mcg of Biotin; and
   jj. from about 6 to about 15 mcg of Vitamin C or Ascorbic Acid;
   wherein the total caloric content is from about 80 kilocalories to about 300 kilocalories per 150 milliliters or 5 fluid ounces.

2. The infant formula of claim 1 wherein, said infant formula is ready-to-feed infant formula or a concentrated infant formula.

3. The infant formula of claim 1 wherein, said infant formula is an exempt infant formula.

4. The infant formula of claim 1 wherein, said infant formula further includes skim milk, lactose-free skim milk, low fat milk, whole milk, organic milk and combinations thereof.

5. The infant formula of claim 1 wherein, said infant formula further includes milk selected from a group of animals consisting of cow, sheep, goat, buffalo, camel, llama, mare, deer and combinations thereof.

6. The infant formula of claim 1 having a refrigeration shelf-life of up to 16 weeks at temperatures of from about 1° C. to about 7° C.

7. The infant formula of claim 1, wherein said infant formula is in a package assembly comprising a gable-top carton or a plastic container.

8. The infant formula of claim 1 wherein said ultra-pasteurization is conducted at 130° to about 150° C. for about 2 to about 5 seconds or said pasteurization is conducted at about 75° to about 95° C. for about 15 to about 55 seconds.

9. The infant formula of claim 1 further including additional amounts of natural antioxidants selected from the group consisting of vitamin C, vitamin E, beta-carotene, selenium, zinc, and combinations thereof.

10. The infant formula of claim 1, wherein the source of protein is selected from the group consisting of skim milk, lactose-free skim milk, casein or caseinate, whey protein, whey protein concentrate, whey protein isolate, milk protein concentrate, milk protein isolate, soy protein, and combinations thereof.

11. The infant formula of claim 1, wherein the source of fat is selected from the group consisting of vegetable oils, medium chain triglycerides, short chain triglycerides and combinations thereof.

12. The infant formula of claim 1, wherein the source of carbohydrate is selected from the group consisting of lactose, sucrose, corn syrup solids, dextrose, glucose, fructose, honey, rock candy, maltodextrin or combination thereof.

13. The infant formula of claim 1, wherein said infant formula is a hypoallergenic infant formula having protein selected from enzymatically-hydrolyzed proteins or peptides, amino acids, and combinations thereof.

14. The infant formula of claim 1, wherein said infant formula is without iron fortification.

15. The infant formula of claim 1, wherein said infant formula is lactose-free or lactose-reduced.

16. The infant formula of claim 1, wherein the infant formula is a soy-based infant formula having soy protein as the protein source.

* * * * *